US006870833B2

(12) United States Patent
Schwartz (10) Patent No.: US 6,870,833 B2
(45) Date of Patent: Mar. 22, 2005

(54) ACTIVE VOICE MESSAGING

(75) Inventor: Daniel I. Schwartz, Flushing, NY (US)

(73) Assignee: Net2Phone, Inc., Newark, NJ (US)

( * ) Notice: Subject to any disclaimer, the term of this patent is extended or adjusted under 35 U.S.C. 154(b) by 263 days.

(21) Appl. No.: 09/908,653

(22) Filed: Jul. 20, 2001

(65) Prior Publication Data

US 2003/0016656 A1 Jan. 23, 2003

(51) Int. Cl.[7] .............................................. H04L 12/66
(52) U.S. Cl. ........................................ 370/353; 379/77
(58) Field of Search ................................ 370/352, 353, 370/465; 379/67.1, 76, 77, 88.22, 88.25

(56) References Cited

U.S. PATENT DOCUMENTS 4,766,604 A * 8/1988 Axberg .................... 379/88.23

6,396,908 B1 5/2002 O'Donovan et al.

OTHER PUBLICATIONS http://www.ual.com/site/primary/0,10017,1973,00.html.
http://www.ual.com/site/primary/0,10017,1127,00.html.
http://www.ual.com/site/primary/0,10017,1972,00.html.

* cited by examiner

Primary Examiner—Frank Duong
(74) Attorney, Agent, or Firm—Oblon, Spivak, McClelland, Maier & Neustadt, P.C.

(57) ABSTRACT

A method and system for delivering messages to customers/subscribers by "pushing" the message to the intended recipient(s) in voice form. By utilizing a digitized voice stream that can be routed over a packet switched network, the message can be distributed to multiple recipients cost effectively.

20 Claims, 6 Drawing Sheets

Figure 6

ACTIVE VOICE MESSAGING

BACKGROUND OF THE INVENTION

1. Field of the Invention

The present invention is directed to a method and system for utilizing voice messaging to deliver information, and, in one embodiment, to a method and system for actively distributing messages using voice over IP distribution techniques.

2. Discussion of the Background

Message delivery has traditionally involved would be callers depositing messages in remote locations specified by the callees. For example, answering machines and voice mail services act as remote repositories that the callee can periodically query to see if waiting messages exist. Such repositories have disadvantages such as: (1) no automatic message delivery, (2) unreliable delivery time at the recipient, (3) a repository is needed (i.e., not all callees have an answering machine or voice mail) and (4) many callees have a single line and no call waiting.

SUMMARY OF THE INVENTION

It is an object of the present invention to provide a "push" of information to customers/subscribers utilizing voice messaging (e.g., non-real-time, store-and-forward voice messaging).

It is an alternate object of the present invention to utilize voice over IP services to perform at least one of message storage and message delivery.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
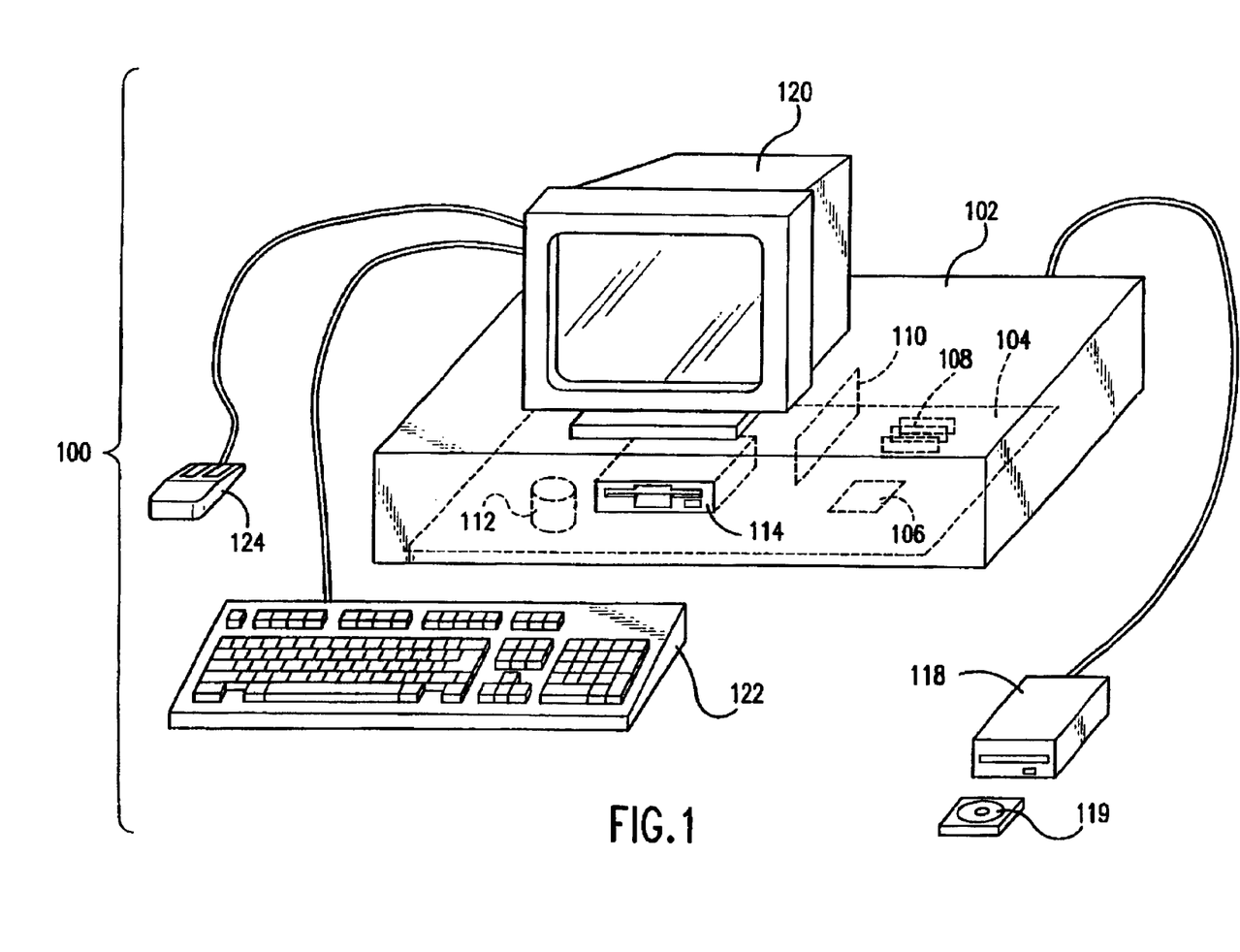
FIG. 1 is a schematic illustration of a computer for performing at least one of message storage and delivery according to the present invention.

Referring now to the drawings, wherein like reference numerals designate identical or corresponding parts throughout the several views, FIG. 1 is a schematic illustration of a computer for performing at least one of message storage and delivery. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of the status of active voice messages.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes (1) software for controlling at least one of the hardware of the computer 100, and the telephone network and (2) for enabling the computer 100 to interact with a human user. Such software may include, but is not limited to, device drivers, operating systems and user applications, such as development tools. Such computer readable media further includes the computer program product of the present invention for delivering or receiving active voice messages, streams and/or information. The computer code devices of the present invention can be any interpreted or executable code mechanism, including but not limited to scripts, interpreters, dynamic link libraries, Java classes, and complete executable programs. Moreover, the computer code devices may be received across a computer network to which the computer 100 is attached (e.g., through dial-up, wireless or direct connect (e.g., Ethernet or token-ring) devices within the computer 100).

As used herein, "Active Voice Messaging" (AVM) is a non-real-time, store-and-forward message delivery service that utilizes digital voice/sound information (e.g., either from sampling an actual analog source or from synthesized models of speech or sound) to deliver messages to intended recipients. Because of its non-real-time nature, the service sending the message can keep attempting to deliver the message until the call goes through and/or the call goes through to a human (i.e., a non-answering machine/voicemail system). ("Passive voice messaging" is also possible in conjunction with or instead of the active voice messaging service. For example, an active voice message which was undeliverable by the system because no one ever answered the phone can instead remain stored in the voice repository for later pickup by a user that calls in to get messages. Thereby becoming a passive voice message since it is "pulled" not "pushed.")

Figure 2:
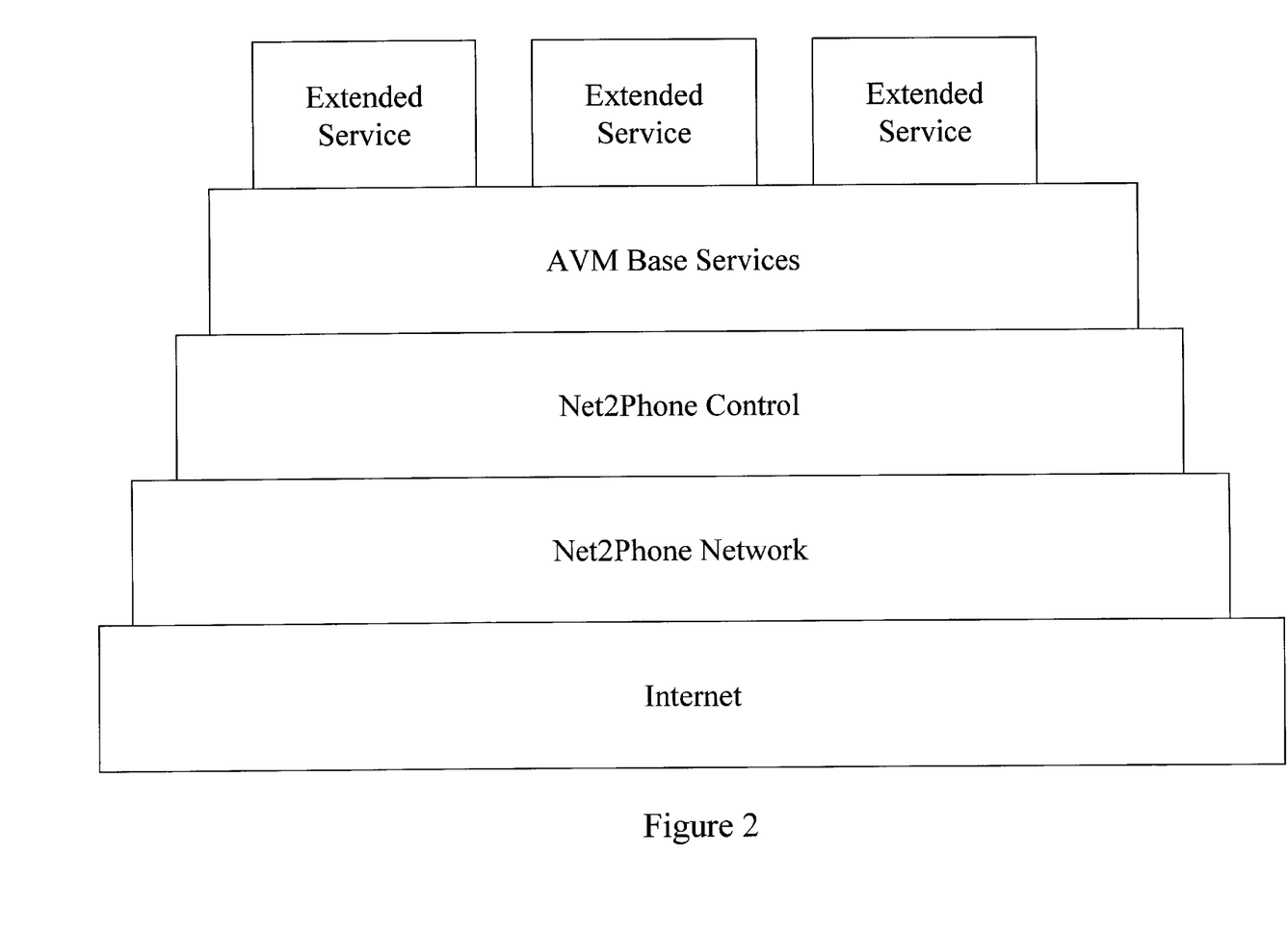
FIG. 2 is a high-level overview of an exemplary layering architecture according to the present invention.

As shown in FIG. 2, each of the "push" services described herein can be considered as an extended service of existing AVM base services. Those AVM base services in turn utilize the call control interfaces that support voice/telephony services (over PSTN systems only, over packet-based systems only, or over combined PSTN and packet systems). By building on "push" technology in general (e.g., outbound dialing, message playback, automatic redialing, scheduled dialing), the extended services can be created more rapidly.

Figure 3:
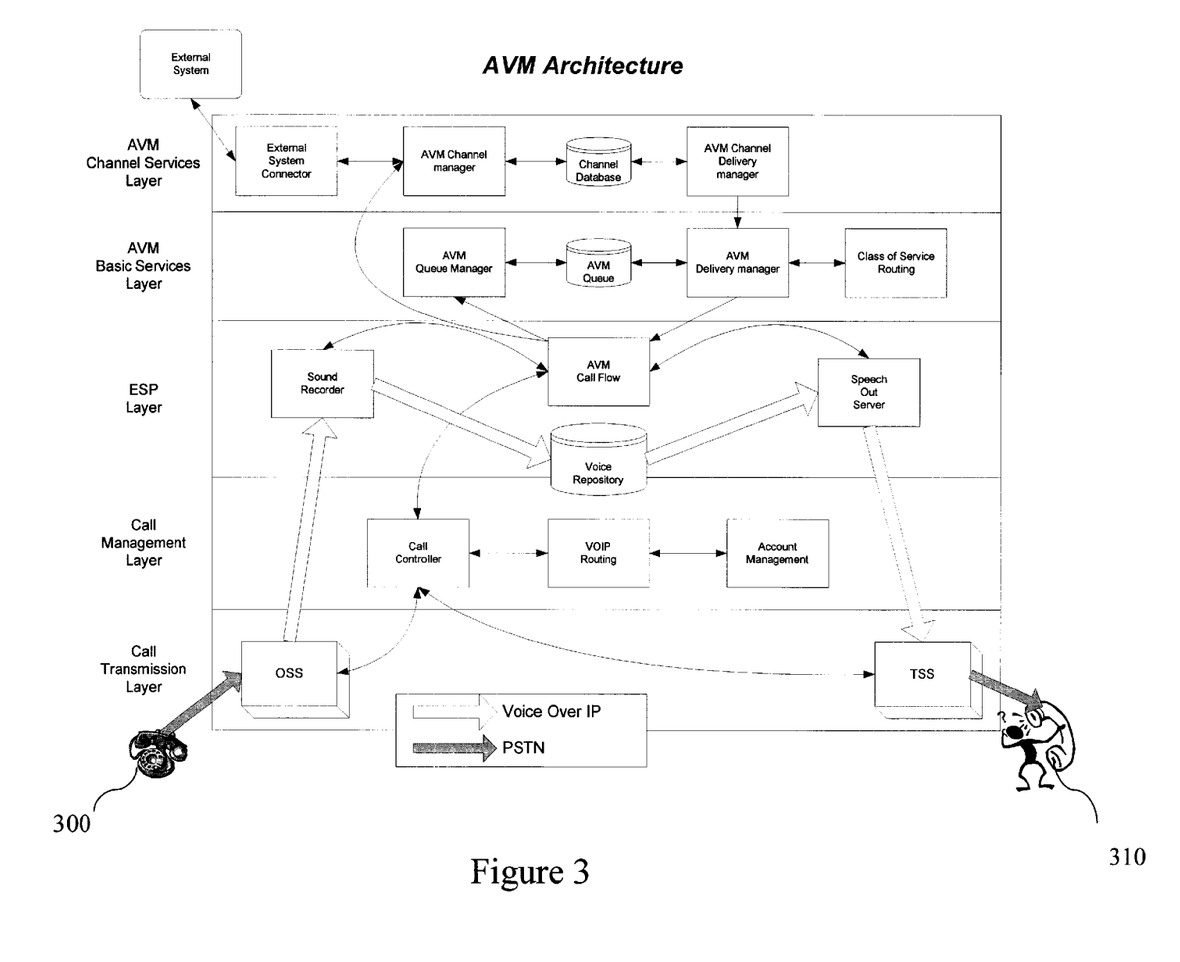
FIG. 3 is an expanded view of the layers of FIG. 2 and their corresponding components as used in recording and delivering a voice message from a caller to an intended recipient.

Messages to be delivered using extended services can be recorded and delivered in any number of ways. In general, as shown in FIG. 3, a message initiator 300, represented as a telephone in the lower left-hand corner in the embodiment of FIG. 3, creates an active voice message to be received by a message recipient 310, represented by a person hearing a message from the telephone in the lower right-hand corner. To deliver the message, the message is recorded by a sound recorder within the telephone system, stored in a voice repository, and played out via a speech out server that delivers the recorded message through a terminating server switch (TSS) associated with the message recipient 310.

In a first embodiment of using the system of FIG. 3, the message initiator 300 dials the phone number of the message recipient 310 intending to talk to the message recipient 310. However, the message initiator 300 is unable to reach the message recipient because of a failed call condition (e.g., the line is already busy or the message recipient does not answer). As a result of a failed call condition, the message initiator 300 is frustrated in his/her attempt to communicate the intended information to the message recipient 310. That frustration also results in lost revenue for the call carrier. Accordingly, the call controller can detect that the call is uncompleted and reroute the call to the active voice messaging service.

If the call controller routes the call to the architecture shown in FIG. 3, the message initiator 300 is notified that the call cannot be completed and provided with the option to leave a message for the message recipient 310 (or even one or more other recipients). If the message initiator 300 selects to leave a message, the sound recorder records the message and places the recorded message in the voice repository. As can be appreciated, this extended service may be a fee-based service. As such, leaving a message may require charging the message initiator 300 (e.g., at the time the message is left), the message recipient 310 (e.g., at the time the message is heard), or both. When the message recipient is charged, the message recipient may be played a portion of the message (e.g., the name and/or number of the message initiator 300) so that the recipient knows if he/she wishes to accept to pay for the message. Alternatively, in an advertising-based embodiment, the recipient 310 is not charged but must instead listen to an advertisement before receiving the message.

Once a message is in the voice repository, the system attempts to deliver the message to the message recipient 310 by dialing the message recipient 310 for a predetermined number of attempts at a predetermined frequency at the number associated with the message. That is, the message is sent to the number that the message initiator 300 dialed or the other number(s) that the message initiator 300 specified at the time the message was left.

Figure 4:
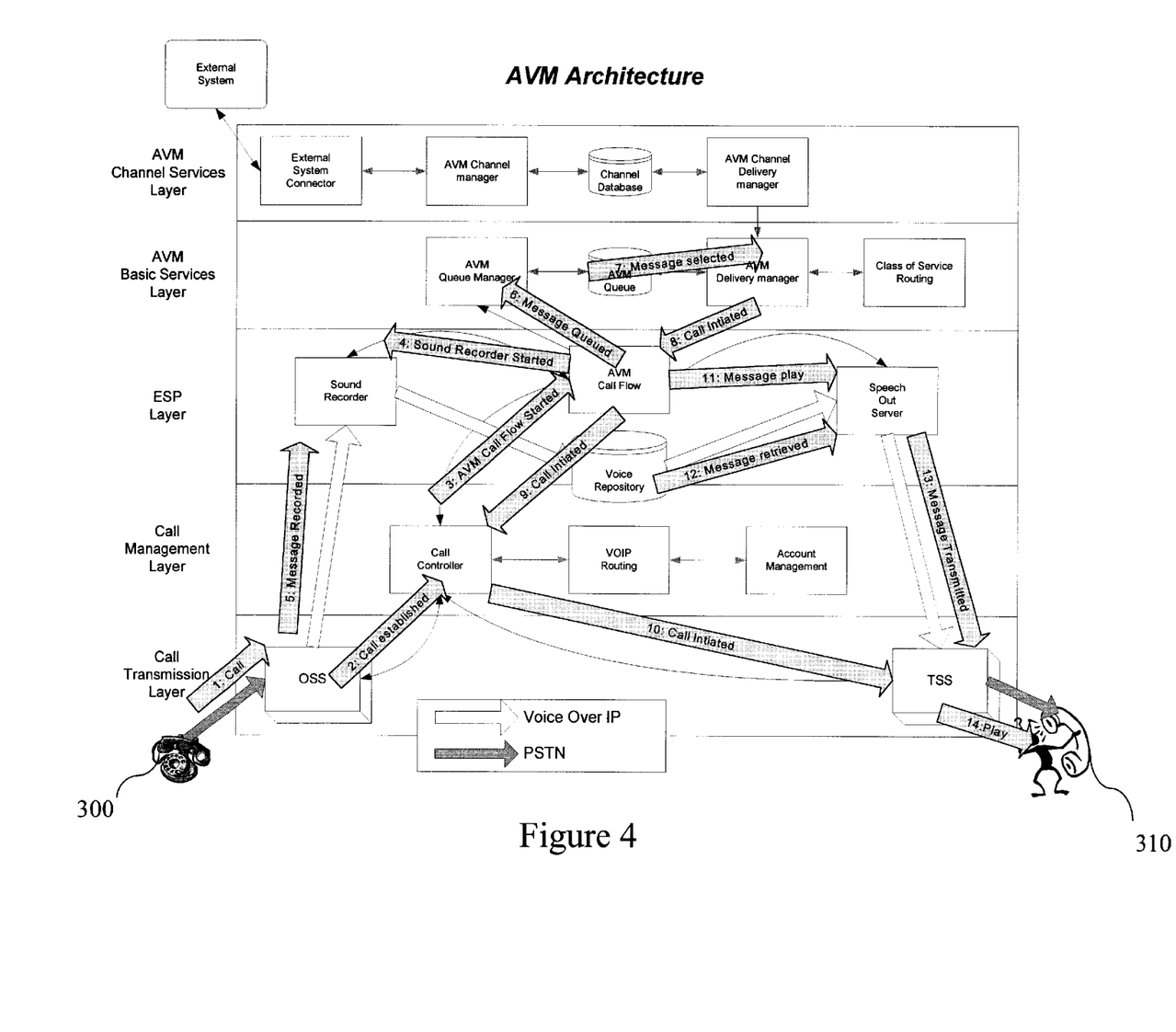
FIG. 4 is a data flow diagram tracing the sequence of steps that create an active voice message from its creation until its delivery.

FIG. 4 illustrates additional detail of the general message recording and delivery steps of FIG. 3. In steps 1 and 2, the call from the message initiator 300 is made through the originating server switch OSS to the call controller which attempts to complete a call to the message recipient 310. When the call attempt fails, in step 3, the call controller in turn establishes a connection to the AVM call flow controller. In step 4, the AVM call flow controller initiates sound recording by communicating with the sound recorder. In step 5, the message is recorded by the sound recorder from the message initiator 300 where it is then placed in the voice repository (as discussed with respect to FIG. 3). In step 6, the AVM Call Flow Controller sends the message information (e.g., who to call and when) to the AVM Queue Manager, where it is later selected in step 7 by the AVM Delivery Manager. The Delivery Manager, in steps 8 and 9, initiates a call using the services of the AVM Call Flow Controller and the Call Controller, respectively. In step 10, the call controller makes a connection to the TSS corresponding to the message recipient 310. When the call is successfully connected, the AVM Call Flow controller initiates playback in step 11 by instructing the speech out server to retrieve the corresponding message from the voice repository. The speech out server retrieves that message in step 12 and performs playback in step 13 such that the message recipient hears the message in step 14.

Figure 5:
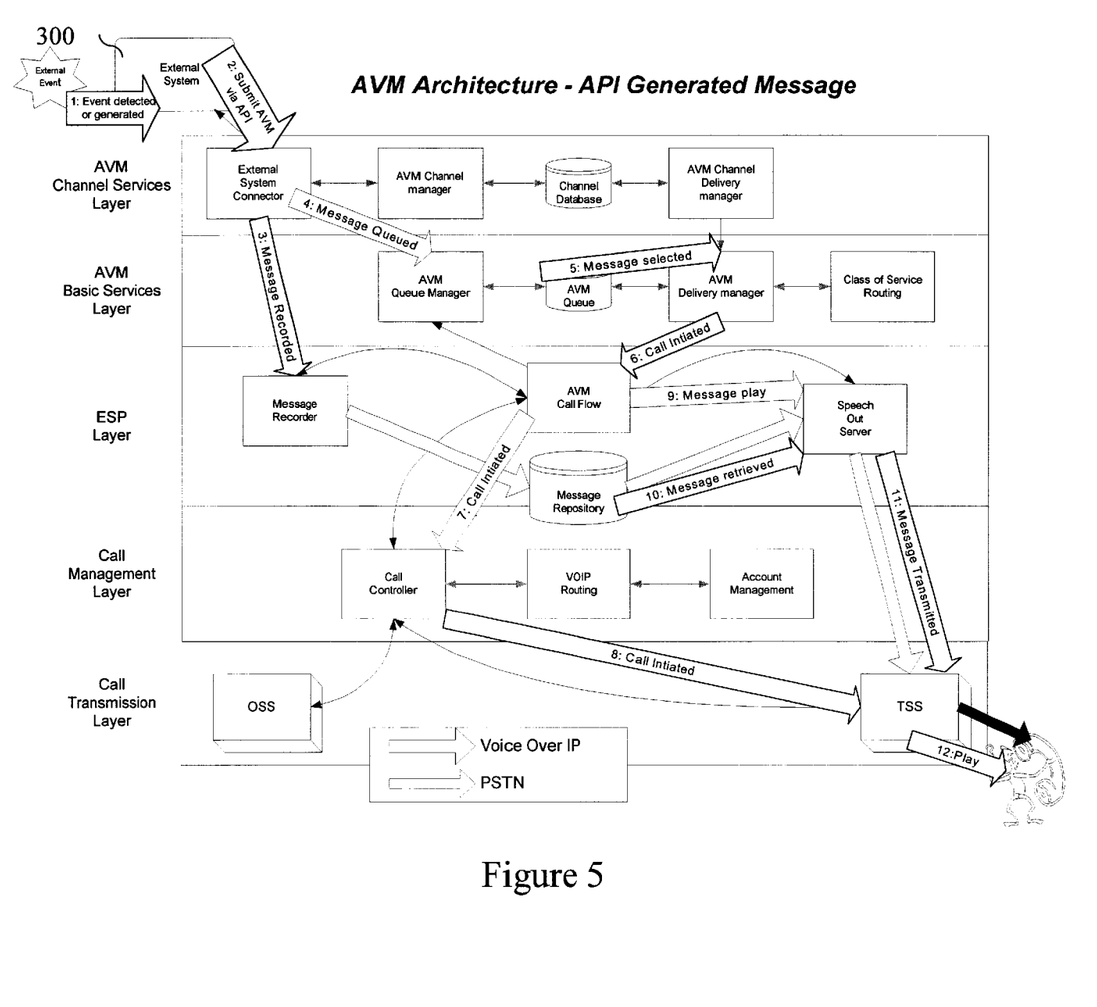
FIG. 5 is an expanded view of the layers of FIG. 2 and their corresponding components as used in recording and delivering a voice message from an API to an intended recipient.

In an alternate embodiment, as shown in FIG. 5, the message initiator 300 can be an external system (e.g., a personal computer or workstation) that detects or generates an event associated with an active voice message. If the active voice message is received from the external system as a voice message in step 3, then delivery proceeds in a fashion analogous to the delivery of messages with respect to FIG. 4. If, however, the message is received via the API as a text message, then the text message is "recorded" and saved as text but the TSS converts the recorded text to audio in the Speech Out Server in step 11.

It is also possible to provide a "voiceless" message in which the call controller "pushes" attempts to reach the message recipient 310, and, when successful, (1) informs the message recipient that it should hold for a call and (2) calls back the message initiator 300, thereby acting as a bridge. The bridge may utilize voice over IP technology to reduce the cost of the connection between the bridged parties. Such a bridge mechanism is especially useful in international contexts where costs may be expensive compared to the local calls from the terminating and originating switches which connect to the end users.

The rerouted call according to the first embodiment need not be rerouted within the same network. For example, a call not completed by a first local or long distance carrier may be rerouted to a second carrier that provides the active voice messaging service when sound recorder and/or voice repository are not services of the first carrier. The first carrier is provided with software conforming to an application programming interface (API) for interacting with the message delivery or message recording and delivery services of the second carrier.

In a second embodiment, the message initiator 300 utilizes the messaging service without first having tried (and failed) to contact the message recipient 310 directly. In such an embodiment, the message initiator 300 wishing to send a message to the message recipient 310 utilizes a dedicated message delivery service. The message initiator 300 dials a toll-based or a toll-free telephone number corresponding to a gateway that provides the service. For example, Net2Phone, the assignee of the current application, presently provides prepaid calling long distance services through such a gateway. Presently, when the gateway answers the call, the customers enter his/her account number and the number to be dialed. Instead, according to the one option of the invention, the user may select an extended service after identifying himself/herself to the gateway.

In a third embodiment, the user identification and message recording is done over a computer (e.g., packet or wireless) network. In such an embodiment, a user utilizes a computer microphone to record the message in digital form, and then the user interface of the computer is used to specify to which number the message is to be delivered. The computer program controlling the user interface can then transfer the message to the gateway over a packet switched network (e.g., the Internet) for a reduced cost. This also alleviates the need to maintain a centralized phone number (800 or toll-free number) for direct voice dialup in all countries where voice messages may originate.

When utilizing the push services as a simple message delivery service, the user records a message to be delivered and selects the telephone number(s) (either implicitly based on the callee in a failed call environment or explicitly based on prompts in which plural callees can be specified) to which the message is to be delivered. This service enables a user to get a message out without potentially having to talk to the callees.

The message delivery techniques described above for the first through third embodiments can be extended with numerous options, as is described below.

In one option, the caller sets up a call "group" which acts as a re-usable set of numbers that can be called to deliver a message. For example, if a sales group needs to get the new prices every Monday morning, a sales manager would record the number of each salesperson to be contacted in a group, then each Sunday night, the manager would record a message for delivery to the group without having to re-enter (or remember) each of the salespeople's phone numbers. Similarly, meeting reminders, priority updates and assignment changes can be delivered using groups.

In an alternate group embodiment, the groups are formed using callee IDs, not phone numbers directly, so that the callees can change where they are to be called. For example, if a salesperson is often on the road, the salesperson may not know whether they will make it to a particular location by Monday morning, so he/she cannot tell the manager where to call to give the new prices. Accordingly, on Sunday night, after checking into a hotel, the salesperson calls the system, identifies where his/her message is to be sent, and knows that the Monday morning message will be correctly delivered.

The use of callee IDs also has the advantage of making message delivery anonymous. A user can register to receive information about events (e.g., using the Web, e-mail or the phone), but the information provider does not know the identity of the user. This is helpful to receive information about stock changes from brokers without enabling the broker to know who you are. This is similar to a general publisher/subscriber model where the publisher and subscriber are disconnected such that the publisher does not need to know the identity of the subscribers. In one sense, the model is similar to a voice message-based LISTSERV.

The use of anonymous lists raises the question of how messaging is paid for. There are four different possibilities: (1) the message initiator pays, (2) the message recipient pays, (3) both the message initiator and recipient pay at least a portion of the cost and (4) neither pay. Generally, except for (4) where advertising or promotional information pays for the messaging, messaging is generally paid for by the party obtaining the benefit of the message. An example of when (1) is appropriate is when the initiator knows the number of people that he wishes to reach and for his benefit wants to get the message to that person. For example, when a call did not go through and the initiator needs to get a message to the recipient, it is generally the initiator that will pay. When the recipient has subscribed to a service whereby the recipient will be informed of certain events, often the recipient will pay since the recipient will obtain the benefit of the information. In such a case, the recipient may pay (a) the message distribution service (e.g., Net2Phone), (b) the message initiator (i.e., the publisher of the information), or (a) and (b). Nonetheless, the initiator may be willing to pay for the message distribution if the initiator can control the number and/or identity of the recipients.

In an embodiment in which messages are to be delivered automatically to a large number of users, it is preferable to use an API to deliver the message and identify the recipients. In this way, (1) lists of recipients can be generated dynamically and (2) an accounting can be made by the software of the number and destination of the messages.

Also, if a caller then begins delivering unsolicited messages, the callee can inform the system that that caller (e.g., the broker) should be blocked from delivering more messages to that callee. Since the API knows each user that is sending out messages, the message initiator (the caller) can be blocked automatically. The caller will then receive a "blocked" notification when checking on delivery, and the number can automatically be removed from the group.

Groups need not be only business related. Families and friends may utilize groups to keep up with activities, send announcements (e.g., birth announcements) or directions to a new house. The group can even be split into parts (e.g., a core group and an extended group) where some parts are called before others.

Schools and teams may also utilize the group-calling feature. Notification of cancellation of school or events can quickly be distributed to all affected people.

Moreover, school groups can be broken down by class as well so that assignments can be updated, parents can be reminded about events, and schedules can be changed.

Community groups can also be formed (e.g., for rumors, gossip, news, announcements) based on interests. Teenagers can pass information within their "clique" easily this way.

Other exemplary areas and their exemplary message types are described briefly below. In each such example, the information provider will utilize an API to enter information into the message delivery system from an associated external system (shown in FIGS. 3 and 4), or the provider will utilize direct dialup and stored or dynamically created message lists.

In the brokerage industry, transaction confirmation messages can be automatically sent to customers when a transaction occurs. Similarly, informational messages can be sent when an event affecting the account occurs (e.g., the balance drops below a specified minimum, or an index, stock or option hits a target price).

News and traffic can likewise be transmitted using the same message delivery techniques. Voice messages can be pushed to subscriber in the event of news regarding subscribed topic or a traffic problem at subscribed traffic hotspot (e.g., GW Bridge).

In the area of auctions, the messaging system can push bids and offers for goods via an auction service (e.g., eBay, Yahoo). Subscribers can also register for events to know when items are to be sold or when prices hit a particular value.

In the transportation industry, passengers can be contacted to be told that their travel plans have been delayed or cancelled. Often this requires reaching a mobile person and will preferably involve sending the message to a mobile telephone.

In the customer relations management industry, customers with questions, complaints or concerns can be reached if the ask for information on a particular product or service.

In one mode of operation, the message to be delivered to the callee is considered delivered if the call is answered. However, in such an embodiment, an answering machine or child may answer the call, and there is no guarantee that the message will actually reach the desired recipient in a timely fashion. Thus, this mode of operation is considered a confirmation-less delivery.

In a confirmation mode of operation, the message is not considered to be delivered unless a confirmation code (e.g., PIN) or voice response is provided. In such an embodiment, a voice prompt (e.g., "This message is important, please confirm delivery is acceptable by pressing or saying "1" now") is played, and the system waits for the specified response (e.g., using DTMF tones or a speech recognition system). Such a confirmation message may be played either at the beginning or the end of the message. Such an embodiment, and other embodiments, may also utilize either (1) Positive Answering Machine Detection or (2) Positive Voice Detection to determine if a machine, rather than a human, is generating the voice heard by the system. In such a case, the system can be programmed to either (1) leave the message on the machine but continue attempting to deliver the message at another location or another time for the same recipient or (2) not leave the message and continue attempting to deliver the message at another location or another time for the same recipient.

In a secure mode of operation, message authorization may also optionally be required for sensitive or confidential messages. By playing a voice prompt (e.g., "This message is for 'Joe Smith' and requires a passcode, please enter it now") and waiting for a specified response (e.g., PIN entered as a series of DTMF tones or a spoken phrase recognized by a speech or voice recognition system), the contents of the message are not divulged to third parties that might answer the phone.

The delivery of messages according to the present invention can be in either immediate mode or scheduled mode. In immediate mode, the system attempts to deliver the message to the intended recipient(s) as soon possible. While this may require redialing in the case of busy signals or no answers, the attempt to delivery begins essentially right away. (This is not to be confused with real-time delivery since the message is still sent on a store-and-forward basis.)

In the scheduled delivery mode, the intended recipient(s) are called according to a specified schedule. Such a schedule may be designed to distribute the calls over a certain period or simply to delay calls to one or more of the intended recipient(s) for a particular time. One such reason for delaying is to ensure that differences in time zones are accounted for. Although it is possible to call people at home at 6 PM, if the caller is on the east coast of the U.S. and the callee is in Europe, the callee will likely be awoken in the middle of the night, causing embarrassment (for the caller) and aggravation (for the callee). Using a schedule, a callee can receive a message early in Europe from a caller in the U.S. that has already gone to bed. The delivery schedule can be further customized to take into consideration work days, weekends, holidays, etc. For example, the system may tell a message initiator "By the way, it is unlikely that I will be able to deliver the message to number XXYYYZZ in France on May 1 since May 1 is a holiday."

In a timed delivery mode, the timing of the message is specified. For example, if the message is time critical, the system can be instructed that the message is to be delivered within the next x minutes or not at all. In such a mode, the message is given a high priority until x minutes elapse, and then the message is removed from the message queue.

In any of the above modes, it is possible that the message cannot be delivered. It is also possible that a number of an intended recipient has been incorrectly entered. In both cases, continuing to redial the number will not be effective. Accordingly, the present invention provides an optional retry limit which will terminate attempts to reach intended recipient(s) after a certain time or number of attempts. When such a failure occurs, the message initiator can be informed via voice message, e-mail, etc.

It is also possible, although not required, to assign a class of service to a message delivery attempt. By specifying that the message has a higher priority (perhaps at an increased expense), the system may attempt to (1) deliver the message more quickly (by placing the message higher in the queue of outgoing messages) or (2) redial more quickly.

The computer system performing the delivery of the messages must keep track of the messages that have been requested to be delivered and which messages are still pending. Accordingly, each message can be assigned a tracking number. The message delivery status (e.g., the information about the date and time of delivered messages) can be sent to callers on a per tracking number basis, either by return voice messaging, by voice-based dial up queries (e.g., calling a number where the message was originally recorded), by regular mail, by courier, or by an on-line information service (e.g., the World Wide Web using a browser).

Utilizing the extended services architecture described with reference to FIG. 2, new extended services can rapidly be built utilizing the API for the system that supports either voice synthesis or digitized voice to inform users of desired events. For example, a brokerage house can build a service using the API by which users register to know when a selected stock (e.g., the Net2Phone stock) has reached a particular price. When registering, the user enters at least one number (and a priority of the numbers if more than one number is entered) to call when the event occurs. Since the brokerage house would allow multiple users to register, a single event may trigger a large number of messages. (That is, there may be a list of people to call, each person having a list of possible numbers to try.) However, the brokerage house need not track all the alternate phone numbers since the tracking is already performed using the API. The brokerage house need only assign each unique event an event number and build a call list based on that number. Once the corresponding event occurs, the brokerage house need only tell the system to call the users corresponding to the event number. For example, the brokerage house randomly assigns unused event number 0x12345678 to the event when stock NTOP reaches 95 if no other person has requested a notification of that event. The call number information for the event is then sent to the external system connector which tracks the call numbers (or callee ID) associated with the event. The next time a user asks to be informed of the same event, the brokerage house uses the API to provide another set of call numbers (or another callee ID) to the external system connector. When NTOP actually hits 95, the brokerage house sends an event message to the external system connector indicating that event 0x123456768 has occurred, and the AVM channel delivery manager begins the message delivery process.

As discussed above, an alternative to simply sending the message to the called party, the present invention can optionally store a callback number such that the called party and the calling party (at the callback number) are joined in a conference call when the called party answers. This too increases the number of minutes of successfully connected telephone conversations. An exemplary call bridging session is provided below.

Caller makes call; gets busy signal or no answer

Caller is prompted:

"Your call did not complete. Hit '1' and Net2Phone will attempt to complete the call later. You will be called back when the call completes."

Net2Phone network pushes the connection request to the recipient who eventually picks up the call.

The recipient is prompted:

"This is Net2Phone calling. A caller at (973) 555-1212 is calling. Please hold while we attempt to complete the call."

The call completes, and the parties converse.

If the callback cannot complete within a specified time (e.g., an hour), the calling party is informed and the current AVM bridging attempt ends.

Figure 6:
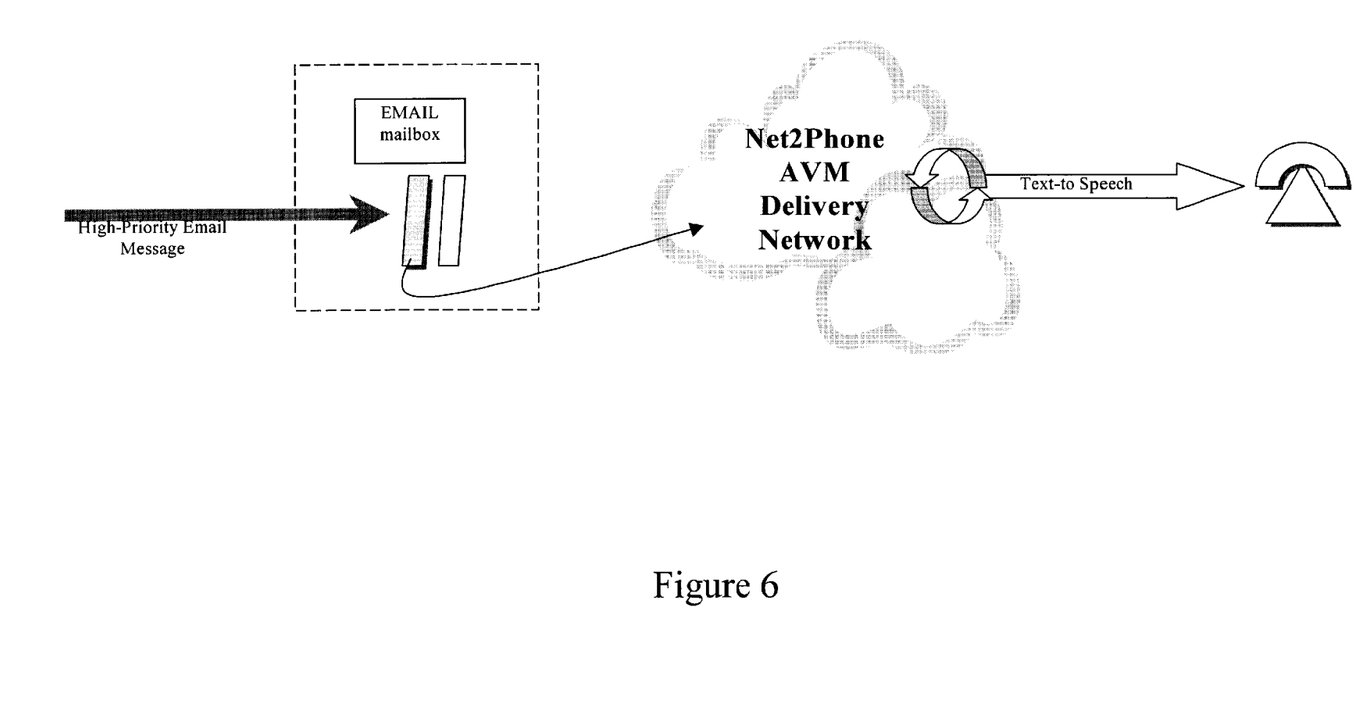
FIG. 6 is a data flow diagram showing how urgent emails can be converted to active voice messages.

Another extended service is a high-priority email message reader. People and especially business people receive high priority—sometimes critical—email messages at their email accounts throughout the day. The problem is that these urgent emails lie in the email box for the user to notice them and read them. When at one's desk this often happens soon enough. The problem occurs when the email arrives when the recipient is not near a computer or an email kiosk. By utilizing an e-mail plug-in, selected email messages (filtered by characteristics of the message (e.g., the sender of the email or keywords)) can be automatically transformed into text-to-speech AVMs that are directed to the mailbox owner's phone as soon as they are received using the message delivery API discussed above. The urgent email messages are then pushed by the AVM network until they are heard by the indented recipient. FIG. 6 illustrates a data flow diagram showing the conversion of email text to an AVM. As always, when used in connection with a packet switched network, the message (in text or voice format) can be moved to the closest gateway to the intended recipient before being played to the user. That is, the text can be sent to the remote gateway closest to the TSS corresponding to the user where it is converted to speech and played out, or the text can be converted to speech near the e-mail system and delivered across the packet network to the TSS already in voice form. The latter approaches generally utilizes more bandwidth over the network than the former since voice packets are transmitted over more links.

As an added step, the recipient of the TTS-synthesized email can be prompted to follow up by: (a) placing a phone call to the email originator, (b) recording an AVM to be sent to the email originator, or (c) recording a voice message that will be returned as an email attachment to the email originator, where cases (a) and (b) have potential to generate new call revenue.

In order to perform messaging between AVM systems, an AVM-to-AVM interface can be utilized such that messages from one AVM system can be sent to another AVM system for distribution. For example, where a packet-switched connection is not available from a first AVM system to a second AVM system, a voice connection can be established and messages can be sent along with distribution information using DTMF tones as control messages before each voice message. In an environment where packet switched connections can be established between AVM systems, messages can be exchanged between systems directly. For example, where company A does not have a local TSS, but company B does, company A may pay company B a portion of the messaging fee to have company B distribute the message using its local TSS.

Numerous modifications and variations of the present invention are possible in light of the above teachings. It is therefore to be understood that, within the scope of the appended claims, the present invention may be practiced otherwise than as specifically described herein.

What is claimed is:

1. A computer program product for controlling a message delivery computer, comprising:
    a first computer code device configured to receive a destination telephone number of an active voice message;
    a second computer code device configured to receive an active voice message to be sent to the destination telephone number;
    a third computer code device configured to control a switch to repeatedly attempt to establish a connection to the destination telephone number; and
    a fourth computer code device configured to track a status of whether the active voice message has been sent to the destination telephone number, wherein the fourth computer code device comprises:
        a fifth computer code device configured to prompt a recipient at the destination telephone number for specified response; and
        a sixth computer code device configured to change a status of the active voice message to "delivered" if the specified response is received from the user.

2. The computer program product as claimed in claim 1, wherein the third computer code device comprises a seventh computer code device configured to attempt to establish the connection taking into consideration a time at a location of the recipient.

3. The computer program product as claimed in claim 1, wherein the fifth computer code device comprises a seventh computer code device configured to prompt the recipient to press a specific DTMF key.

4. The computer program product as claimed in claim 1, wherein the fifth computer code device comprises a seventh computer code device configured to prompt the recipient to enter a secret PIN using DTMF keys.

5. The computer program product as claimed in claim 1, wherein the third computer code device comprises a seventh computer code device configured to attempt to establish a connection to the destination telephone number at a frequency based on a class of service.

6. The computer program product as claimed in claim 1, wherein the third computer code device comprises a seventh computer code device configured to attempt to establish a connection to the destination telephone number no more than a specified number of times.

7. The computer program product as claimed in claim 1, wherein the third computer code device comprises a seventh computer code device configured to attempt to establish a connection to the destination telephone number in an order based on a class of service.

8. The computer program product as claimed in claim 1, further comprising a seventh computer code device configured to charge a message initiator for delivery of the active voice message.

9. The computer program product as claimed in claim 1, further comprising a seventh computer code device configured to charge a message recipient for delivery of the active voice message.

10. The computer program product as claimed in claim 1, further comprising a seventh computer code device configured to activate the first through fourth computer code devices based on a failed call attempt.

11. A computer-implemented method for controlling a message delivery computer, comprising:

receiving a destination telephone number of an active voice message;

receiving an active voice message to be sent to the destination telephone number;

controlling a terminating side switch to repeatedly attempt to establish a connection to the destination telephone number; and tracking a status of whether the active voice message has been sent to the destination telephone number, wherein the step of tracking comprises:

prompting a recipient at the destination telephone number for a specified response; and changing a status of the active voice message to "delivered" if the specified response is received from the user.

12. The method as claimed in claim 11, wherein the step of controlling comprises attempting to establish the connection taking into consideration a time at a location of the recipient.

13. The method as claimed in claim 11, wherein the step of prompting comprises prompting the recipient to press a specific DTMF key.

14. The method as claimed in claim 11, wherein the step of prompting comprises prompting the recipient to enter a secret PIN using DTMF keys.

15. The method as claimed in claim 11, wherein the step of controlling comprises attempting to establish a connection to the destination telephone number at a frequency based on a class of service.

16. The method as claimed in claim 11, wherein the step of controlling comprises attempting to establish a connection to the destination telephone number no more than a specified number of times.

17. The method as claimed in claim 11, wherein the step of controlling comprises attempting to establish a connection to the destination telephone number in an order based on a class of service.

18. The method as claimed in claim 11, further comprising charging a message initiator for delivery of the active voice message.

19. The method as claimed in claim 11, further comprising charging a message recipient for delivery of the active voice message.

20. The method as claimed in claim 11, further comprising recording the active voice message in response to a failed call attempt.

* * * * *